US012608302B2

(12) United States Patent (10) Patent No.: US 12,608,302 B2
Perlov (45) Date of Patent: Apr. 21, 2026

(54) METHOD AND SYSTEM FOR EFFICIENTLY CREATING AND ASSESSING WORK AND DATA FLOWS

(71) Applicant: K2View LTD, Yokneam Ilit (IL)

(72) Inventor: Yuval Perlov, Kochav Yair (IL)

(73) Assignee: K2View LTD, Yokneam Ilit (IL)

( * ) Notice: Subject to any disclaimer, the term of this patent is extended or adjusted under 35 U.S.C. 154(b) by 606 days.

(21) Appl. No.: 17/527,000

(22) Filed: Nov. 15, 2021

(65) Prior Publication Data

US 2022/0180258 A1 Jun. 9, 2022

Related U.S. Application Data

(60) Provisional application No. 63/114,365, filed on Nov. 16, 2020.

(51) Int. Cl.
G06F 11/3698 (2025.01)
G06F 8/34 (2018.01)

(52) U.S. Cl.
CPC ............ G06F 11/3698 (2025.01); G06F 8/34 (2013.01)

(58) Field of Classification Search
CPC ............................... G06F 8/34; G06F 11/3664
See application file for complete search history.

(56) References Cited

U.S. PATENT DOCUMENTS 9,766,927 B1 * 9/2017 Islam .................... G06F 9/4498
2001/0043346 A1 * 11/2001 Roztocil ................ G06Q 10/10
358/1.9

2005/0149908 A1 * 7/2005 Klianev .................... G06F 8/34
717/109
2008/0040181 A1 * 2/2008 Freire .................. G06Q 10/103
705/7.26
2009/0007122 A1 * 1/2009 Peyton ...................... G06F 7/00
707/999.005

(Continued)

FOREIGN PATENT DOCUMENTS

CN 1558738 A * 12/2004 ............... A61B 8/00

*Primary Examiner* — Phillip H Nguyen
(74) *Attorney, Agent, or Firm* — Wilmer Cutler Pickering Hale and Dorr LLP

(57) ABSTRACT

Systems and methods for dynamically modeling a workflow and identifying parameters in a computing environment are disclosed. In some non-limiting embodiments, the dynamic modeling workflow system may include circuitry, such as a processor, that generates the workflow information to be displayed on a display for a user. The workflow information may contain information representing a first actor configured to perform a first operation and having a first output for outputting first data and a second actor configured to perform a second operation and having a first input for inputting the first data from the first output. In addition the workflow information may be configured to provide a visual representation of the order in which the first actor and the second actor perform the first operation and second operation, respectively, and information about the first data. Additionally, the workflow information may include first and second stages representing a first and second steps in the workflow and comprising the first and second actors, respectively. A method performed by the workflow system is also provided.

20 Claims, 9 Drawing Sheets

(56) References Cited

U.S. PATENT DOCUMENTS

| | | | | |
|---|---|---|---|---|
| 2010/0251155 A1* | 9/2010 | Shah | ................... | G06Q 10/0633 |
| | | | | 718/100 |
| 2012/0180028 A1* | 7/2012 | Saji | ..................... | G06F 11/3664 |
| | | | | 717/132 |
| 2012/0198457 A1* | 8/2012 | Leonelli | ................. | G06Q 10/06 |
| | | | | 718/102 |
| 2013/0152041 A1* | 6/2013 | Hatfield | ................. | G06Q 10/06 |
| | | | | 717/105 |
| 2014/0282177 A1* | 9/2014 | Wang | ..................... | G16B 50/00 |
| | | | | 715/771 |
| 2017/0024437 A1* | 1/2017 | Look | ..................... | G06F 16/248 |
| 2019/0324893 A1* | 10/2019 | Vaishnav | ............ | G06F 11/3664 |
| 2020/0174887 A1* | 6/2020 | Wilding | ............. | G06F 11/3688 |
| 2021/0093794 A1* | 4/2021 | Volkar | ................... | G16H 40/63 |

* cited by examiner

200

300

400

METHOD AND SYSTEM FOR EFFICIENTLY CREATING AND ASSESSING WORK AND DATA FLOWS

RELATED APPLICATIONS

This application claims priority to U.S. Provisional Application No. 63/114,365, filed Nov. 16, 2020, the disclosure of which is hereby incorporated in its entirety.

FIELD OF THE DISCLOSURE

The present disclosure relates to generating a workflow that simultaneously displays the transfer of data and the order of workflow operations. It also relates to a workflow that dynamically identifies parameters in real time to enhance the visibility of data flows and to diagnose and correct errors in real time.

BACKGROUND OF THE DISCLOSURE

Flow diagrams are used in a variety of settings to visually represent an ordered step of events. For example, a business may use a process diagram to model the steps its employees should take to handle routine customer questions. A business may also use a data flow to model how information, data, or supplies are exchanged among its many individual departments or teams.

A workflow may include an execution flow or a data flow. Execution flows represent ordered lists of discrete tasks executed in a specific sequence. However, a traditional execution flow may not accurately reflect complicated relationships between tasks or entities performing the tasks. Furthermore, typical execution flows do not allow a user to easily introduce changes to simulate scenarios with different data or parameters. A data flow may track how data is transmitted within a system, but it does not help a user visualize how an execution flow executes the tasks or generates the data. Therefore, there is a need for systems and methods that can receive a set of data, effectively generate a workflow and data flow, and more easily modify the generated work and data flows.

SUMMARY OF THE DISCLOSURE

An illustrative embodiment of a workflow modeling system is provided. In some implementations, the system comprising: at least one interface configured to output workflow information; and circuitry configured to generate the workflow information. The workflow information may comprise information representing a first actor and a second actor. The first actor may be configured to perform a first operation and have a first output for outputting first data, and the second actor may be configured to perform a second operation and have a first input for inputting the first data from the first output. The workflow information may also be configured to provide a visual representation of the order in which the first actor and the second actor perform the first operation and second operation, respectively, and information about the first data.

BRIEF DESCRIPTION OF THE DRAWINGS

Various objectives, features, and advantages of the disclosed subject matter can be more fully appreciated with reference to the following detailed description of the enclosed subject matter when considered in connection with the following drawings, in which like reference numerals identify like elements. The following drawings should not be construed as limiting the present disclosure and are intended to be illustrative only.

DETAILED DESCRIPTION OF EMBODIMENTS

Figure 1:
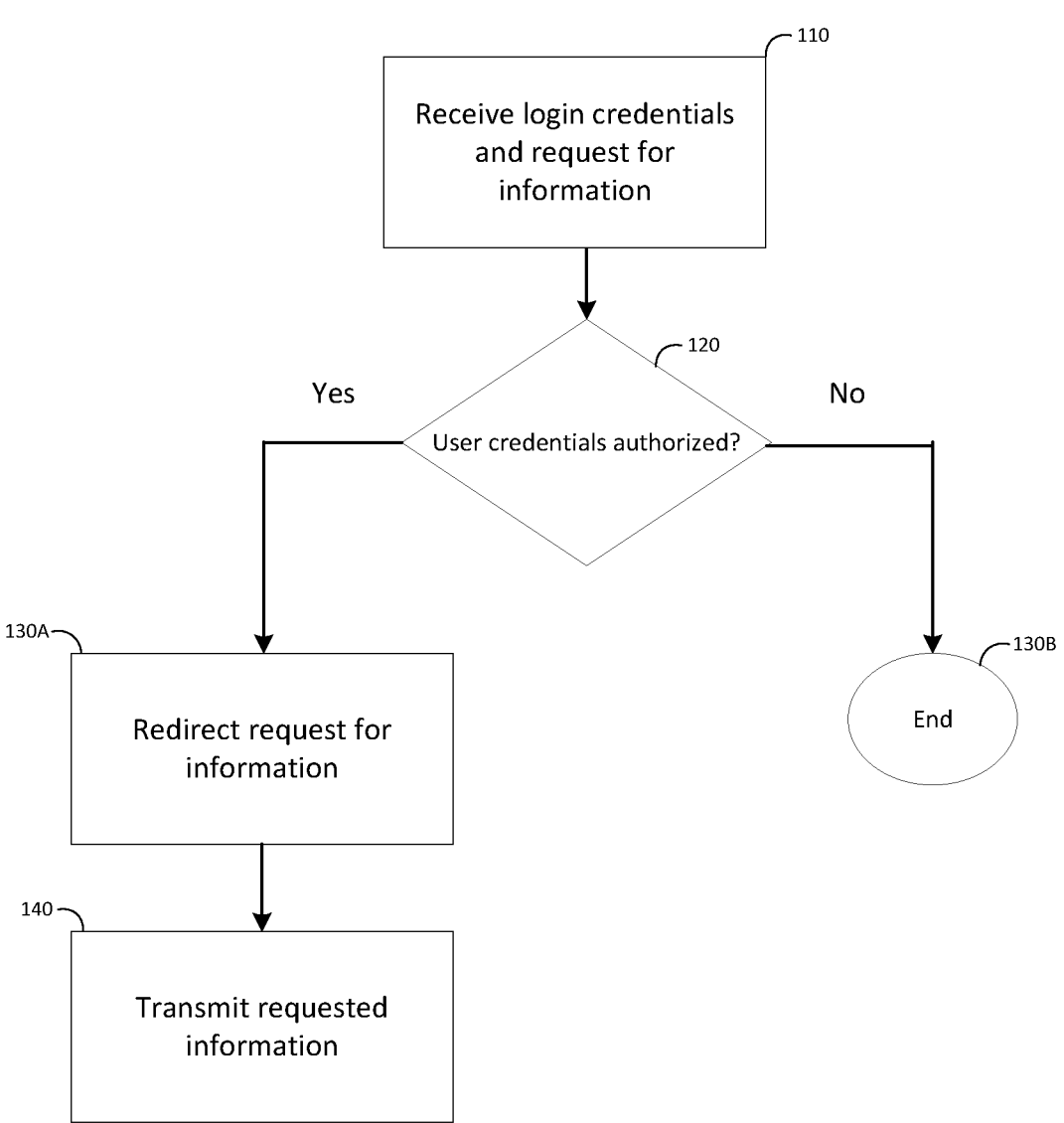
FIG. 1 illustrates an example of a workflow.

FIG. 1 illustrates an example of a workflow for handling a user's request for information. In block 110, a module, such as an authenticator module, or login portal, may receive login credentials along with a request for protected or confidential information. For example, a consumer who shops at an online retailer may wish to access historical information associated with the consumer's account (e.g., purchase history, financial records, profile information, etc.) by accessing the retailer's system over the Internet via an end user computer. However, due to the personal nature of the information requested, the online retailer's system may only provide such information upon receiving valid login credentials (such as a user name and password) from the consumer via the end user computer. In block 120, the retailer's system analyzes the received login credentials and determines if the received credentials are correct. For example, the online retailer's system may use a lookup table to compare the received login credentials to a list of valid retail consumer credentials stored in a database. If the received login credentials are not associated with a valid consumer record, then the process may simply terminate in block 130B. Alternatively, the system may send a message back to the consumer's end user computer indicating that the credentials were invalid and prompting the consumer to input the credentials again. On the other hand, if the received login credentials match a valid consumer record, then the process may proceed to block 130A. In block 130A, the authenticator module of the retailer's system may pass along the request for information to another module in the retailer's system that can process the request. For example, the authenticator module can redirect or transmit the request for information to a remote server hosting a database storing customer information. In block 140, the system may transmit the requested information back to the consumer's end user computer. For example, upon receiving a request for a specific customer's purchase history, the retailer's system may extract the information from a consumer records database and transmit the information back to the end user computer in the form of a webpage, spreadsheet, table, file, or other format.

Figure 2:
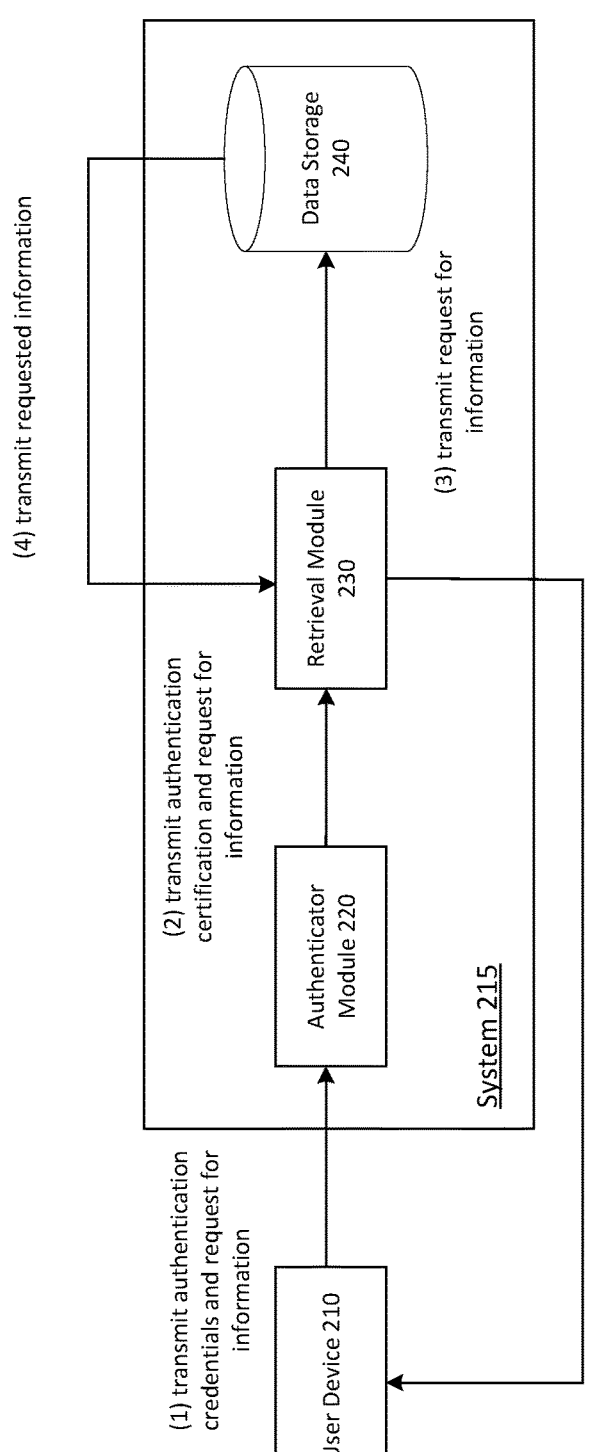
FIG. 2 illustrates an example of a data flow.

FIG. 2 illustrates an example of a data flow associated with the workflow described above in FIG. 1. The process is performed in a system 200, which comprises a user device 210 (such as the consumer's end user computer) and the retailer's system 215. System 215 comprises authenticator module 220, retrieval module 230, and data storage 240. In some embodiments, user device 210 and system 215 may be connected via a communication pathway (e.g., a local wireless network, a wired connection, the Internet, etc.). User device 210 may transmit authentication credentials (such as login credentials) and a request for information to system 215 (per item (1) in FIG. 2). Authenticator module 220 may then receive the credentials and confirm the validity of the credentials by, for example, matching the received credentials with a master list of confirmed user credentials. In some embodiments, authenticator module 220 may transmit an authentication certification and the request for information to retrieval module 230 (per item (2) in FIG. 2). In some embodiments, retrieval module 230 may be configured to communicate with data storage 240 (such as a database) to extract information in response to the request for information. The retrieval module 230 transmits or passes along the request for information to data storage 240 (per item (3) in FIG. 2). For example, retrieval module 230 may transmit an identifier associated with the user (e.g., a unique user pin number or user ID) which may then be used by data storage 240 to search for the stored data associated with the user. Data storage 240 may then transmit the requested information back to retrieval module 230 (per item (4) in FIG. 2). Retrieval module 230 may then transmit the information received from data storage 240 to user device 210 over the communication pathway (per item (5) in FIG. 2).

There are disadvantages associated with the workflow and dataflow illustrated in FIGS. 1 and 2. For example, the workflow of FIG. 1 shows the high level steps involved in handling a user's request for information. However, while FIG. 1 displays steps in a sequential order, it does not provide any detailed information regarding how such steps are actually implemented in a system. For example, a basic business flow, such as one shown in FIG. 1, does not show which modules, processors, or other system components are assigned to execute the tasks in the workflow. Furthermore, the basic workflow does not show how multiple components within the system communicate and transfer data within the system while performing the workflow to accomplish the tasks. Therefore, for example, if an error occurs while executing the business flow, a user will have difficulty diagnosing the exact cause and location of the error within the system.

The data flow illustrated in FIG. 2 also presents its own problems. For example, the data flow shows system modules and components as well as the flow of data within the system. Such a data flow may be easy to follow assuming the tasks executed to generate the data are simple. However, a user may be quickly overwhelmed in embodiments where many different components and modules must execute complex tasks to generate and transfer data. In some embodiments, multiple data flows may exist at any one time and may execute simultaneously, further frustrating a user's efforts to understand how each data flow factors into the overall workflow. It is therefore desirable, in some non-limiting embodiments, to provide a system that allows a user to examine the details of a complex data flow while also allowing the user to keep track of the broader workflow process at any step and point within the system.

Figure 3:
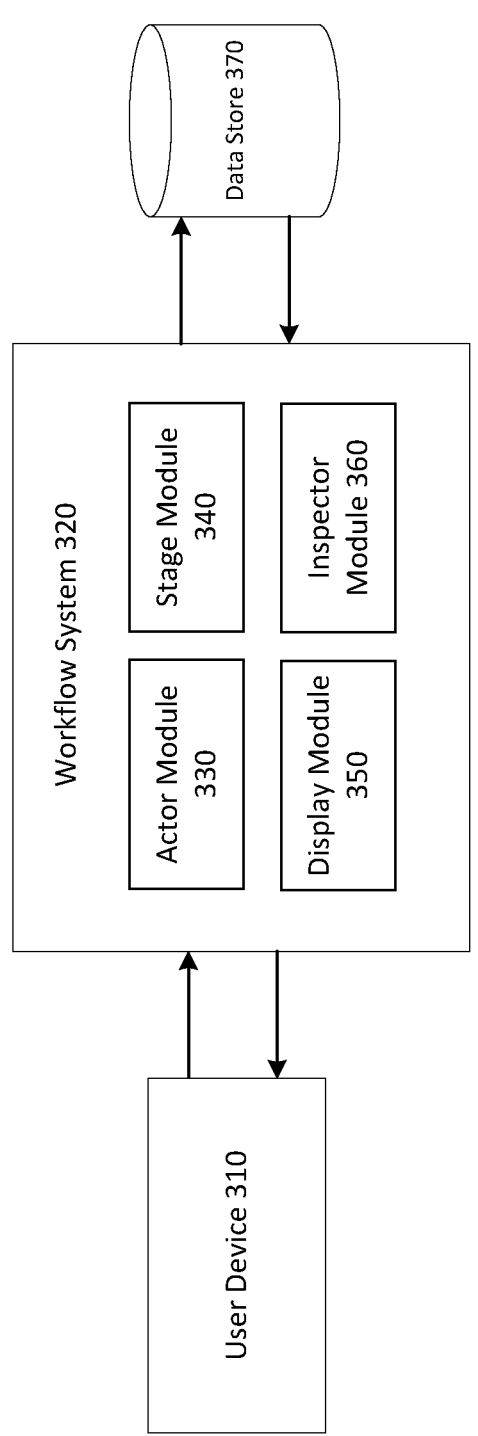
FIG. 3 is a diagram illustrating an example of a dynamic workflow modeling system, according to an embodiment of the present disclosure.

FIG. 3 is a diagram illustrating an example of a dynamic workflow modeling environment, in accordance with a non-limiting embodiment, which shows how certain modules and devices may interact to generate a dynamic workflow. The dynamic workflow operates in an environment 300 and comprises a user device 310, workflow system 320, and data store 370. In some embodiments, user device 310, workflow system 320, and data store 370 may be configured to exchange information via one or more communication pathways, such as a variety of wired and/or wireless networks, including but not limited to local area networks, wide area networks, and/or the Internet. In some embodiments, user device 310 may be any device associated with a user, such as, for example, a desktop computer, a laptop computer, a mobile smartphone, tablet, wireless device, or other device.

As further shown in FIG. 3, the workflow system 320 includes an actor module 330, a stage module 340, a display module 350, and an inspector module 360. The modules 330, 340, 350, and 360 may be implemented by software, such as software executed by a processor, components, packages, classes, objects, or a collection of interactive objects. Alternatively, the modules 330, 340, 350, and 360 may be implemented by dedicated hardware, such as an ASIC, individual processing units, storage devices, I/O devices, or communication devices. Yet still, the modules 330, 340, 350, and 360 may be implemented with a combination of hardware and software. The display module 350 may include a display, such as LCD, LED, or OLED monitor. The display module 350 may alternatively or additionally include software, hardware, or combination of software and hardware that creates data to ultimately be displayed on a display.

Actor module 330 may be configured to receive an input, execute a specific set of actions, and generate an output as part of the dynamic workflow modeling process. For example, actor module 330 may be configured to accept an input (e.g., a numeric value), execute a set of operations based on the input (e.g., multiply the numeric input by 2), and produce an output (e.g., a modified numeric value). In some embodiments, actor module 330 may include one or more "actors," with each actor being configured to perform a different or redundant set of instructions or operations. These "actors" may be predefined and/or may be customized and created by a user. Furthermore, the "actors" may be stored in a database. As noted below, in one implementation, the actors constitute smaller "building blocks" that perform particular operations and can be easily and efficiently combined to perform a wide variety of robust functions and operations.

In one embodiment, an "actor" may be a reusable piece of logic, with inputs and outputs, that can be assembled with other actors to create more complex logic. For example, a first actor may be a data structure configured to receive an array of numbers as an input, multiply each number in the array by 10, and output a new array comprising the multiplied numbers. The first actor may be used together with a second actor, which may receive the new array as an input and produce another output. In one implementation, an actor may be an object-type data structure configured to execute a set of instructions on data stored in the data structure.

As an additional example, while one actor may be configured to multiply an input numeric value by 2 and output the result, a different actor may be configured to accept a different type of input (e.g., a floating point integer) and generate a different output (e.g., a string). In some embodiments, actor module 330 may be configured to receive edits or changes from a user. For example, a user may access workflow system 320 via an appropriate user interface (such as a keyboard, mouse, and monitor) to add additional actors to actor module 330. These additional actors may by predetermined actors and/or may be predetermined actors that have been modified by the user. In some embodiments, a user may instead create one or more actors "from scratch" according to the user's own specifications. As will be described in connection with FIG. 4, actors may be linked together such that a first actor may generate an output that may be used as an input for a second actor. In some embodiments, actors may have an "inheritance" hierarchy that allows an actor to use logic or arguments used in another actor. For example, a "calculator" actor, which is configured to perform a variety of mathematical operations on input numbers, may inherit logic used to add numbers together from an "addition" actor and may also inherit logic used to multiply numbers together from a "multiplication" actor. In other embodiments, actors may reuse a constant value across multiple flows or reuse actor logic such as JavaScript or SQL. In yet other embodiments, actors that are linked together may themselves be collectively saved as a single actor. Once the linked actors are saved as a new, single actor, this new actor may be reused in the same dynamic workflow or another flow. It will be appreciated that the actors may be configured in alternative ways depending on the implementation.

Stage module 340 may be configured to represent one or more steps or stages in the dynamic workflow process. For example, in a dynamic workflow model representing the workflow associated with certifying a user's credentials, the stage module 340 may generate or utilize a first stage for receiving a user's credentials before transmitting requested information to a user, a second stage for authenticating the credentials, and a third stage for transmitting an authentication message and/or the requested information to the user. It will be appreciated that other dynamic workflows may use a different number of stages and configurations. Stages may be arranged and executed in a specific order. For example, the stage associated with receiving a user's credentials may be executed before the stage associated with authenticating the received credentials. A user may use stage module 340 to rearrange a plurality of stages in any order the user wishes. Furthermore, in some embodiments, a user may generate a stage and populate the stage with one or more actors of the user's choosing. In certain implementations, the actors in a particular stage may be executed simultaneously, and in other implementations, the actors may be executed sequentially or in another designated order. In some embodiments, each stage can be assigned an error handler. The error handler may be an actor that contains logic to execute an action if an error occurs during a stage. For example, a stage's error handler may be an actor that terminates the stage upon encountering an error. In one example, a stage that is responsible for performing transformations on entries in an array may include an error handler that automatically terminates the process if the referenced array is empty.

Display module 350 may be configured to generate a visual representation embodying the various stages and actors in a dynamic workflow model. Such a visual representation will enable a user to assess the operations of the dynamic workflow (including the data generated by the workflow) and modify them if needed. Examples of such a visual representation are discussed below with reference to FIGS. 4-8.

Inspector module 360 may generate an overlay or window while workflow system 320 executes at least one stage in a dynamic workflow model. Alternatively or additionally, inspector model 360 may generate an overlay or window before, during, or after the workflow system 320 executes one or more or all stages in a dynamic workflow model. As explained via a non-limiting example in more detail below, the inspector overlay or window may be configured to display a variety of information during the execution of the dynamic workflow model. For example, inspector module 360 may generate an overlay displaying input and output parameters of all actors in the dynamic workflow. In some embodiments, inspector module 360 may only display additional information upon receiving a user input. For example, the inspector module 360 may display the input and output parameters of a specific actor only when a user selects the actor with a mouse click or touch gesture or when the user uses a mouse to hover a cursor/pointer over the actor. In some embodiments, inspector module 360 may be configured to display other information. For example, inspector module 360 may display a visual indication showing what stage is currently being executed in real time. By displaying information during execution in real time, inspector module 360 allows a user to test, understand, and debug a dynamic workflow in an efficient, easy, and transparent manner.

In some embodiments, data store 370 may be a database stored on a remote server or in local memory. Data store 370 may store information being processed by workflow system 320. For example, if a stage in workflow system 320 generates or outputs a result (e.g., a string), that result may be stored in data store 370. In some embodiments, data store 370 may additionally or alternatively store a plurality of predefined actors or stages. The workflow system 320 may then refer to data store 370 to reuse the actors or stages that are already stored in data store 370. If a user creates a new actor or stage, data store 370 may be updated to include the new actor or stage.

Figure 4:
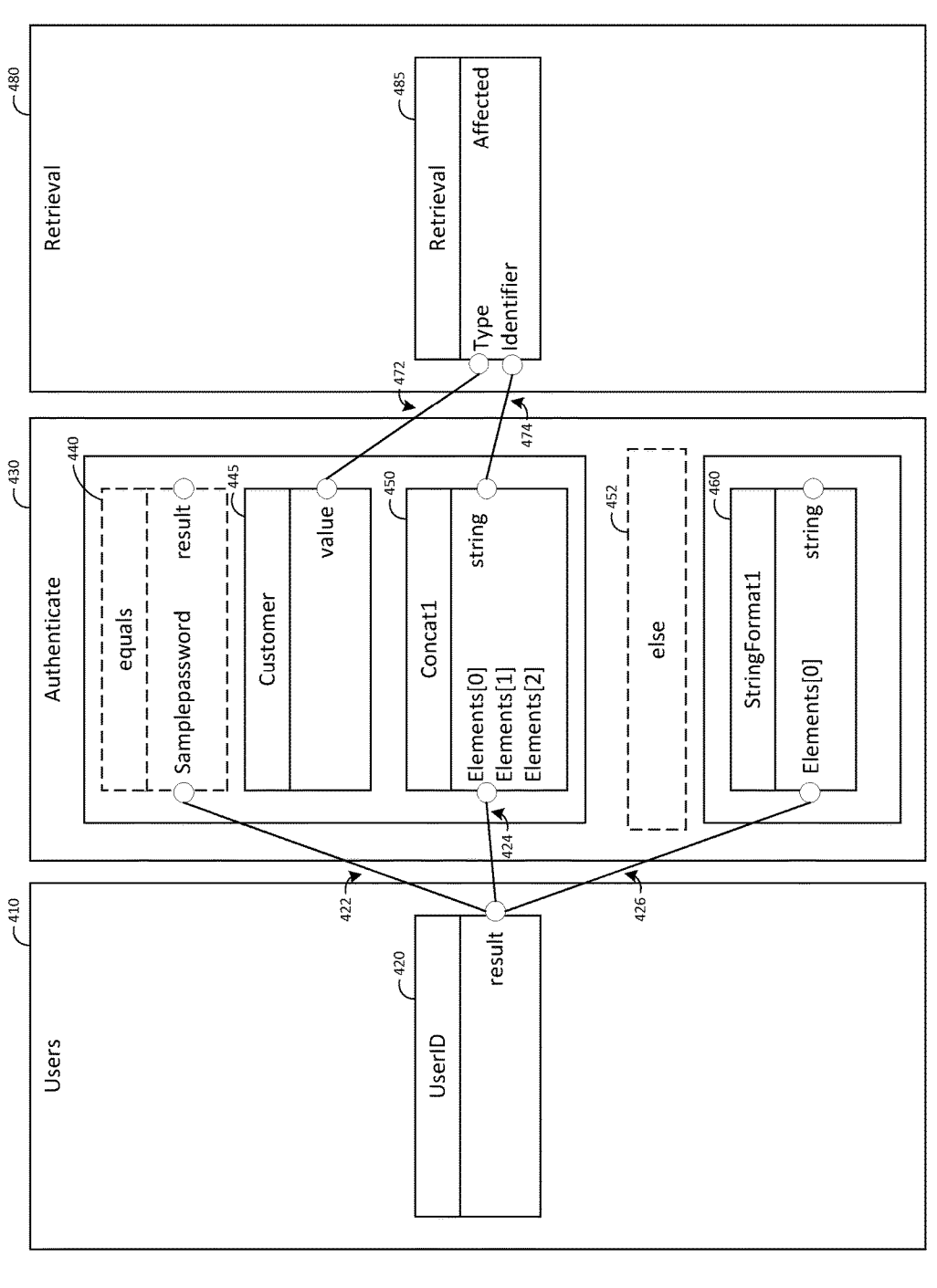
FIG. 4 is a diagram illustrating an example of a dynamic workflow model, according to an embodiment of the present disclosure.

FIG. 4 is a diagram illustrating an example dynamic workflow model 400. In this example, model 400 is associated with an authentication and information retrieval workflow and can be executed through workflow system 320 and displayed via display module 350. Model 400 comprises a user ID stage 410, and authentication stage 430, and an information retrieval stage 480. Each of the stages 410, 430, and 480 represents a step in the authentication and information retrieval workflow.

Each of the stages 410, 430, and 480 may comprise at least one actor. For example, stage 410 comprises a user ID actor 420. Stage 430 comprises an equals actor 440, a customer actor 445, a concat1 actor 450, an else actor 452, and a stringformat1 actor 460. Stage 480 comprises a retrieval actor 485. Actors within a stage may be further divided into groups. For example, Stage 430 includes actors 440, 445, and 450 in one group (as denoted by the solid-lined box surrounding the actors 440, 445, and 450), while actor 460 is separated into its own group within the same stage (as shown by the box around actor 460). In some embodiments, actors belonging to a single group may be implemented as sub-actors in one larger actor representing the entire group. Stages 410, 430, and 480 are displayed in order from left to right and may be executed sequentially in that order as well. It will be appreciated that some embodiments may utilize a different arrangement of stages and execution order. While the order of steps in a flow may be visually represented (e.g. via display module 350) by the sequential order of the stages 410, 430, and 480 (e.g. from left to right), the flow of data associated with the process may be visually represented in the dynamic workflow model as well.

As shown in the example in FIG. 4, display module 350 of workflow system 320 may display the flow of the work and data as a series of nodes and links connecting actors together via their inputs and outputs. For example, the output of actor 420 from stage 410 is provided to the input of actor 440 via link 422, to the input of actor 450 via link 424, and to the input of actor 460 via link 426. Similarly, the output of actor 445 is provided to a first input of actor 485 via link 472. The output of actor 450 is provided to a second input of actor 485 via links 474.

In this embodiment, each of stages 410, 430, and 480 comprises one or more actors to execute specific instructions or operations to be performed during the stage. For example, the users stage 410 in the workflow system 320 may receive user credentials (e.g. user ID and an alphanumeric password such as "Samplepassword") from a user's end user computer for accessing data in the user's account. In this example, stage 410 comprises the single user ID actor 420, which forwards the received user ID and password ("Samplepassword") from its output to the authentication stage 430 via links 422, 424, and 426.

As shown in the example, authentication stage 430 uses multiple actors 440, 445, 450, 452, and 460 to authenticate the user ID and password. The equals actor 440 may receive the user's password ("Samplepassword") (and/or the user ID) from actor 420 via its input over link 422 and compare it to a list of authorized passwords (and/or user IDs). If the received password (and/or user ID) matches one of the passwords (and/or user IDs) on the list, the process may proceed to the customer actor 445. In this case, actor 445 may transmit an integer value (e.g., 1), which indicates that the password (and/or user ID) has been authenticated, via its output to the first input of retrieval actor 485 via link 472. In response to the actor 445 generating the integer value (e.g. 1), the concat1 actor 450 may also input the received alphanumerical password ("Samplepassword") from the actor 420 via link 424 store it as an string array "Elements [0]." If equals actor 440 determines that the received password ("Samplepassword") (and/or user ID) matches one of the passwords (and/or user IDs) on the list, customer actor 450 may provide a string (e.g., "Samplepassword accepted") to the second input of actor 485 via link 474. It should be noted that, in some embodiments, actor 450 is not limited to inputting only one array element "Elements[0]." In some embodiments, actor 450 may include Elements[1], Elements [2], or any other number of array entries to accept a variable number of inputs. In yet other, non-limiting embodiments, equals actor 440 may not output a "result" of is analysis of the password and/or user ID to customer actor 445 or concat1 actor 450 via an external link. For example, customer actor 445 and concat1 actor 450 may be integrated or otherwise closely associated with equals actor 440, such that they "internally" receive the result of equals actor 440. Such a relationship between the actors 440 and the actors 445 and 450 may be denoted by a dashed border notation of actor 440 and/or by the solid border box surrounding the three actors 440, 445, and 450), as shown in FIG. 4.

However, if equals actor 440 determines that that received password ("Samplepassword") (and/or user ID) does not match one of the authorized passwords (and/or user IDs), then customer actor 445 may output a different integer value (e.g., 0) via link 472 to the first input of actor 485 indicating that the password has not been authenticated. In this case, the authentication stage 430 may proceed to the else actor 452 and then, to the stringformat1 actor 460. As shown in FIG. 4, the stringformat1 actor 460 receives the alphanumerical password ("Samplepassword") from the actor 420 via link 426 and stores it as an string array "Elements[0]." The actor 460 may output a string (e.g., "Samplepassword denied") that can be displayed on the end user device. Moreover, the actor 460 may prevent the process from proceeding to the retrieval stage 480 and actor 485 so that confidential information is not retrieved during the stage 480. In some embodiments, actor 460 may be integrated or otherwise closely associated with else actor 452 and may be executed without receiving an input from actor 452 via an external link. Such a relationship between the actors 452 and 460 may be denoted by a dashed border notation of actor 452, as shown in FIG. 4.

As indicated above, retrieval actor 485 is configured to receive an integer value from actor 445 via its first input and an alphanumeric string from actor 450 via its second input. The actor 485 stores the integer value as a "type" and stores the alphanumeric string as an "identifier." For example, actor 485 may receive an integer value (e.g. a 0 or 1) from actor 445. When the actor 485 receives a value of "1," it knows that the password ("Samplepassword") (and/or user ID) has been successfully authenticated. One the other hand, when the actor 485 receives a value of "0," it knows that the password is not correct.

In some embodiments, actor 485 may be configured to perform a set of actions depending on the received inputs. For example, if actor 485 receives the integer value "1" from the actor 445 and the string "Samplepassword accepted" from the actor 450, it may pass along the string to the user for display on the user's computer and grant the user access to protected information or supply requested information to the user's computer.

Figure 5:
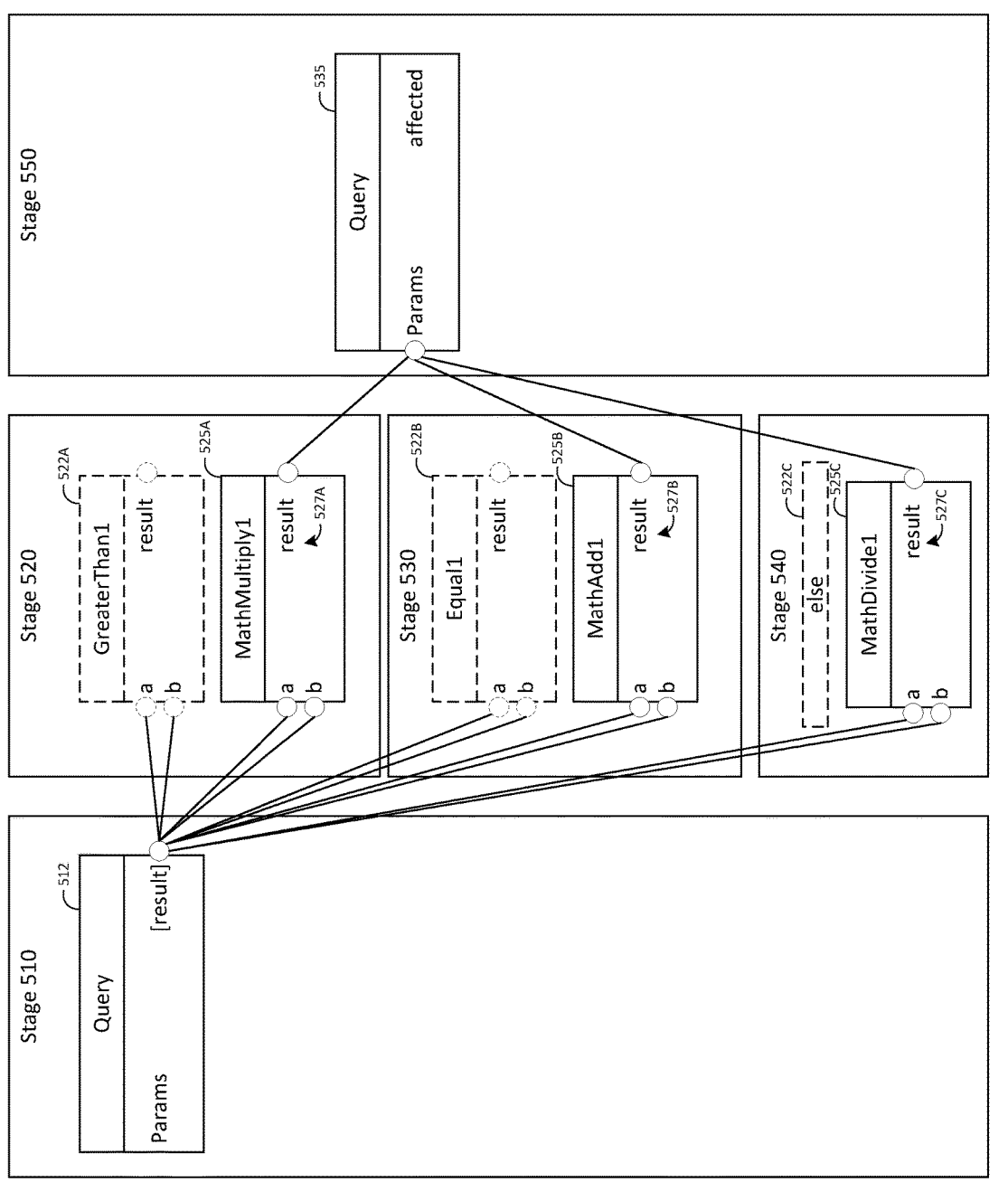
FIG. 5 is a diagram illustrating an example of a dynamic workflow model with conditional stages, according to an embodiment of the present disclosure.

FIG. 5 is a diagram illustrating an example of a dynamic workflow model with conditional stages. Multiple stages and actors may be used in a dynamic workflow to represent a process involving conditional steps. As shown, the model includes five stages, 510, 520, 530, 540, and 550. Stage 510 includes a query actor 512. Stage 520 includes a greater-than1 actor 522A and a mathmultiply1 actor 525A. Stage 530 includes an equal1 actor 522B and a mathadd1 actor 525B. Stage 540 includes an else actor 522C and a math-divide1 actor 525C. Stage 550 includes a query actor 535.

As shown in this example, the workflow system 320 executes one of stages 520, 530, or 540 depending on the output of query actor 512 in stage 510. For example, the output of actor 512 may be an array of integers (e.g., labeled "[result]") containing integers (e.g., integers a and b), and the array of integers are provided to stages 520, 530, and 540. For example, the output of actor 512 may be transmitted to actors 522A, 525A, 522B, 525B, and 522C, as shown in FIG. 5. In some embodiments, stages 520, 530, and 540 may be executed sequentially. For example, stage 520 may be executed before stages 530 and 540, and stage 530 may be executed before stage 540. In other embodiments, stages 520, 530, and 540 may be configured to be executed simultaneously. In yet other embodiments, stages 520, 530, and 540 may be configured to check for different conditions, as will be discussed below.

At stage 520, actor 522A receives the array of integers a and b from actor 512 and determines if both integers are greater than a predetermined value (e.g., 1). If so, actor 522A may generate and/or output a Boolean value "true" as the result. When the value is "true," the stage 520 may execute actor 525A, which multiples the integers a and b together to generate result 527A (e.g., an integer value c=a*b). Then, actor 525A may output result 527A to actor 535 in stage 550.

On the other hand, if actor 522A determines that the integers a and b are not greater than 1, it generates and/or outputs a Boolean value "false," and the actor 525A does not perform its operation on the integers a and b. If the stages are executed sequentially (as opposed to simultaneously), the value "false," may cause stage 530 to be executed. Alternatively, if stages 520, 530, and 540 execute simultaneously, stage 530 may execute regardless of the result of stage 520 (and actor 522A within the stage 520).

At stage 530, actor 522B determines if the integers a and b are both equal to the value 1. If integers a and b are both equal to the value 1, actor 522B may generate and/or output the Boolean value "true." In this case, stage 530 then executes actor 525B, which adds the input integers a and b together to generate result 527B (e.g., an integer value c=a+b). Then, actor 525B may output result 527B to actor 535.

On the other hand, if actor 522B determines that integers a and b are both not equal to 1, actor 522B generates and/or outputs a Boolean value "false," and the actor 525B does not perform its operation on integers a and b. If the stages are executed sequentially (as opposed to simultaneously), the output value "false," may cause stage 540 to be executed.

At stage 540, actor 525C may perform a different mathematical operation on input integers a and b. For example, actor 525C may divide integer a by integer b to generate result 527C (e.g., a floating point value c=a/b) and output the result to actor 535.

Each of stages 520, 530, and 540 represents a set of processes that may be sequentially executed after stage 510, such that stages 520, 530, or 540 may be executed one at a time. In some embodiments, multiple stages may be executed simultaneously. Although FIG. 5 represents conditions as multiple stages, it will be appreciated that conditional flows may be represented in other ways in other embodiments. For example, a single stage may comprise multiple actors, wherein each actor in the stage is associated with a separate condition.

While actors 522A and 522B represent conditions that are mutually exclusive, it will be appreciated that multiple conditions may be satisfied at the same time in some embodiments. For example, a first actor (e.g. a "Greater-Than1" actor) may determine whether integers a and b are both greater than 1 (like actor 522A), and a second actor (e.g. a "GreaterThan5" actor) may determine whether integers a and b are both greater than 5. In this case, both actors may return the Boolean value "true" if the integers a and b are both equal to 7. Similarly, multiple conditions may fail at the same time in some embodiments. For example, the GreaterThan1 actor and the GreaterThan5 actor may both return Boolean values "false" if input integers a and b are both numbers smaller than 1. Also, in some embodiments, actors 522A, 522B, and 522C are stylized with dashed lines in this embodiment to indicate that they do not provide an output via external links to other actors and are closely associated with other actors, as explained above.

Figure 6:
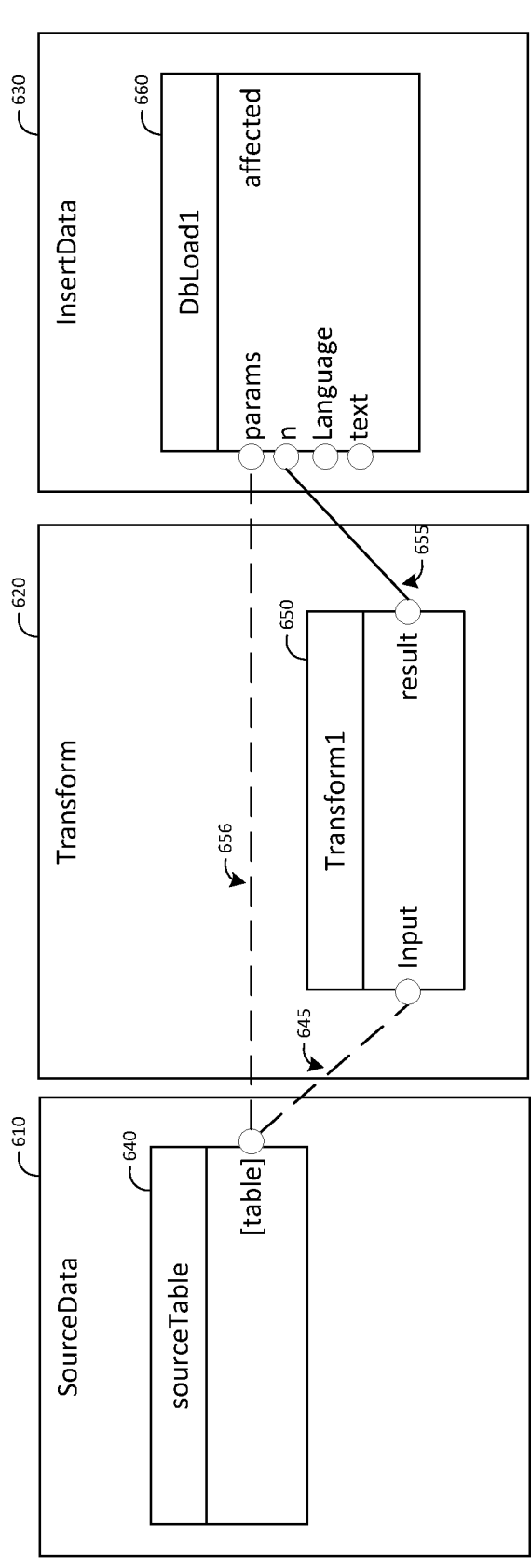
FIG. 6 is a diagram illustrating an example of a dynamic workflow model performing an iterative operation, according to an embodiment of the present disclosure.

FIG. 6 illustrates an example of a dynamic workflow model performing an iterative operation. Stages and actors may be arranged in a dynamic workflow to represent any sort of task or process that a user wishes. The workflow system 320 may then execute the stages in order from left to right. However, certain processes may require iterative operations and may require certain actors or stages to execute more than once. For example, performing some sort of data transformation on multiple entries in a database or traversing through an array may require an actor to repeatedly perform the same operations on different information.

As shown, the model includes a sourcedata stage 610, a transform stage 620, and an insertdata stage 630. The source data stage 610 has a sourcetable actor 640 that retrieves data from a first location in a table stored in a database, and outputs the first data via link 645 to the transform stage 620. Stage 620 has a Transform1 actor 650 that inputs the first data and transforms it (e.g., by performing a mathematical operation) and outputs the transformed data via a link 655 to the InsertData stage 630. Stage 630 has a DbLoad1 actor 660 that inputs the transformed data and stores it in a database. Then, as shown by link 656, sourcedata stage 610 is executed again.

As such, in this example, stages 610, 620, and 630 are sequentially executed a number of times to similarly process data located in other locations of the table. Workflow system 320 may therefore represent the iterative operation using a combination of dashed links 645 and 656 and non-dashed link 655. In some embodiments, a dashed link may signal to workflow system 320 that a specific action must be performed in successive iterations. For example, dashed link 656 signals that each entry of the original table in stage 610 is transmitted over to actor 660, and dashed link 645 signals that Transform1 actor 650 must perform a data transformation for each entry referenced in sourceTable 640. Transform1 actor 650 may perform an alteration or transformation operation on the received inputs. For example, if the input table from sourceTable 640 is a table of customer names and associated passwords, Transform1 actor 650 may adjust each password entry to reflect any user password changes but leave the customer names unchanged. By contrast, a non-dashed link may signal that an action does not need to be iteratively performed on multiple entries. For example, non-dashed link 655 signals that no traversal is needed because Transform 1 receives only one input at a time (via link 645) and generates one corresponding output (on link 655).

Figure 7:
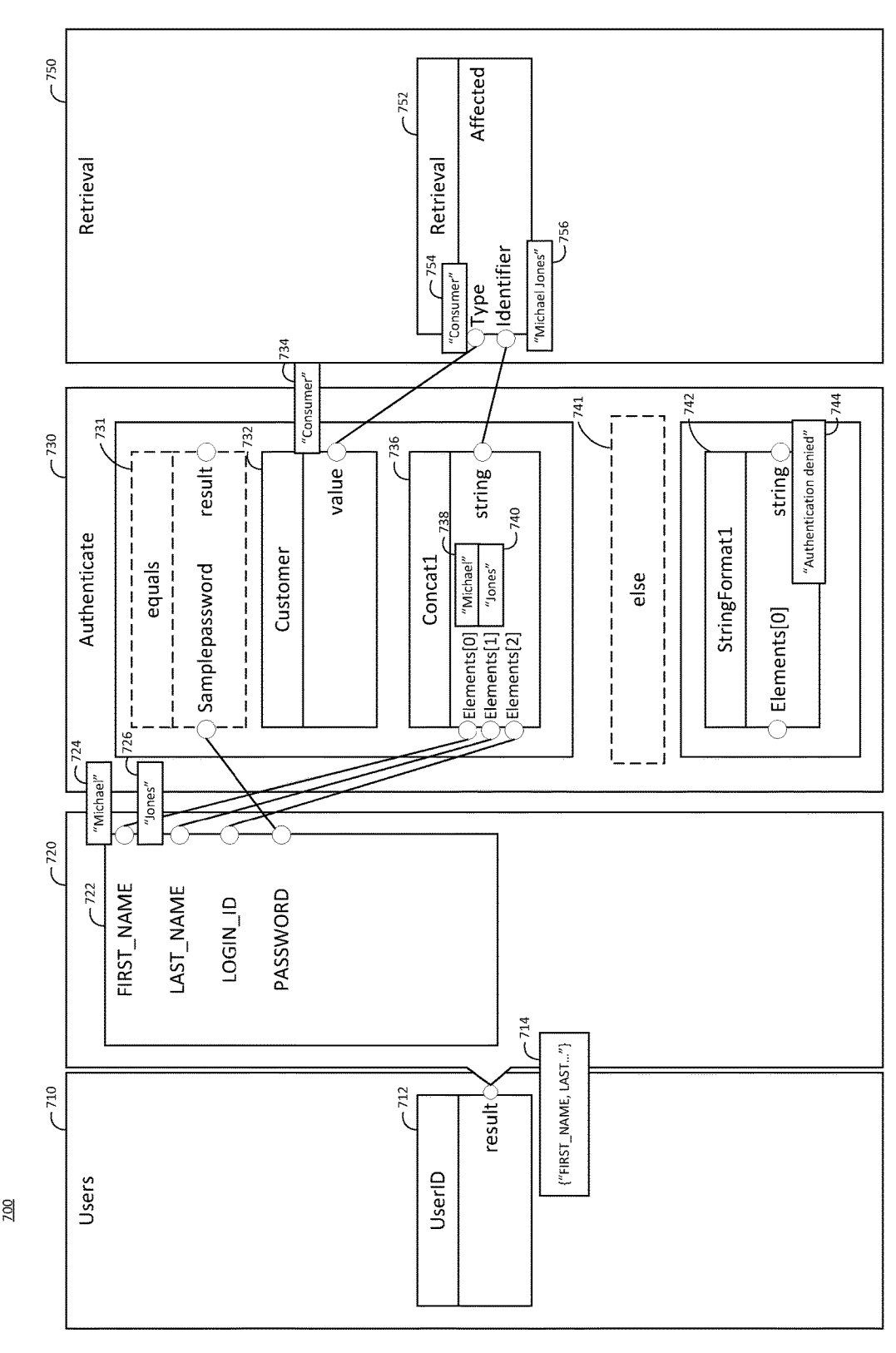
FIG. 7 is a diagram illustrating an example of a dynamic workflow model data inspector, according to an embodiment of the present disclosure.

FIG. 7 is a diagram illustrating an example of a dynamic workflow model data inspector 700, which may be implemented via inspector module 360. As explained above, the inspector 700 (implemented in one example via the inspector model 360) may generate an overlay before, during, or after the workflow system 320 executes at least one stage in a dynamic workflow model. This overlay may be configured to display a variety of information during the execution of the dynamic workflow model, such as input and output parameters of the actors in the dynamic workflow.

As such, in one example, the dynamic workflow model data inspector 700 shown in FIG. 7 displays information for a user to review during the execution of the dynamic workflow. By displaying information during execution, the inspector 700 may offer a transparent view of how data flows in the process. Accordingly, the inspector 700 may be helpful to check for errors in the process or to determine how modify the process to perform different, but similar tasks.

The inspector 700 may display a variety of information on the screen by default or in response to some user input. In the embodiment shown in FIG. 7, the inspector 700 is used in conjunction with dynamic workflow model that is similar to the dynamic workflow model 400 shown in FIG. 4. Thus, operations of the model shown in FIG. 7 that are similar to the operations of the model 400 shown in FIG. 7 are omitted for the sake of brevity.

In one embodiment, if the user moves a mouse via a user interface to hover a cursor above an input or an output of an actor, the inspector 700 may display a window showing at least some of the information that will be, has been, or is being, provided from the output. For example, if the user moves the cursor over the "result" output of the actor 712, the inspector 700 may display a small window 714 containing some information, such as strings or parameters including the first name "FIRST NAME" and last name "LAST NAME" of a user requesting information from the system. Alternatively, the system may automatically display a small window, such as the window 714, all the time, during a specific operational mode, or periodically, without having to hover a cursor above the input or output of an actor.

In a further implementation, if the user actually selects the input or output of an actor (e.g., via a mouse click), the inspector 700 may generate a larger window to display more detailed information. For instance, continuing with the example above, if the user clicks on the small window 714 or the "result" output with the mouse, the inspector 700 displays a larger window 720 to display more detailed information output from the actor 712. Namely, as shown, the window 720 contains a list 722 indicating that the output of the actor 712 includes multiple strings or parameters, including the first name "FIRST NAME," last name "LAST NAME," user ID "LOGIN ID," and password "PASSWORD" of the user requesting information from the system.

Furthermore, the list of strings or parameters in a larger window may indicate which strings or parameters are input from or output to which actors. For example, the larger window 720 may indicate that the "FIRST NAME," "LAST NAME," and "LOGIN ID" parameters are output from actor 712 to actor 736 in stage 730 (as noted by the links between the parameters and the inputs to the actor 736). Additionally, the window 720 may indicate that the "PASSWORD" parameter is output to the actor 731 in stage 730 (as noted by the link between the parameter and the actor 731).

In yet another embodiment, the inspector 700 may offer more detailed information about the workflow model in case the user desires additional information. For example, as shown in FIG. 7, additional windows 724, 726, 734, 738, 740, 744, 754, and 756 are provided that display the actual contents or values of specific parameters generated by actors and/or exchanged between actors during or after they are input to or output from the actors. For example, the window 724 indicates that the "FIRST NAME" parameter output from actor 712 has a value "Michael," and the window 726 indicates that the "LAST NAME" parameter output from actor 712 has a value "Jones." Similarly, the windows 738 and 740 indicate that the actor 736 inputs the "FIRST NAME" parameter having the value "Michael" as Element [0] and the "LAST NAME" parameter having the value "Jones" as Element[1]. Also, windows 734 and 754 indicate that a string having a value "Consumer" is output from actor 732 and input to actor 752, and window 756 indicates that a string having a value "Michael Jones" is input to actor 752. These additional windows 724, 726, 734, 738, 740, 744, 754, and 756 may be displayed at all times, individually selectively displayed upon the user's request, and/or displayed when the inspector 700 is operated in a certain mode. Moreover, in one implementation, the windows 724, 726, 734, 738, 740, 744, 754, and 756 (as well as the windows 714 and 722) may be updated in real time so that the user can see how the information propagating through the dynamic workflow changes during execution. As such, the inspector 700 provides increased transparency of how data flows in a dynamic workflow process. In some embodiments, inspector 700 may display an additional window displaying even more detailed information when the user performs a selection action (e.g., a mouse click) on a specific actor, input, or output.

Similar to the operation of the dynamic workflow model 400 shown in FIG. 4, actor 731 in stage 730 may input the "PASSWORD" parameter having a certain value and may determine if it matches a password, such as "Samplepassword," on a list of valid passwords. If there is a match, actor 731 may return a Boolean value "true" indicating that the password has been validated. In some embodiments, and as described above in conjunction with FIG. 4, this Boolean value "true" output from actor 731 may be used by actors 732 and 736. For example, if the password is validated as "true," then actor 732 may output a string (e.g., "consumer," "administrator," or "seller" account) identifying the type of account associated with the validated password. In this example, the type of account is a consumer account, and the actor 732 outputs the string "Consumer" (as indicated by window 734). Then, as indicated by window 756, the string "Consumer" is received by actor 752 in stage 750.

Additionally, as shown in FIG. 7, after actor 736 receives the "FIRST NAME," "LAST NAME," and "LOGIN ID" parameters as inputs, it may transmit them as an output string to actor 752 in stage 750. For example, as shown, the actor 736 receives the "FIRST NAME" parameter having a value "Michael" (as indicated by window 738) and receives the "LAST NAME" parameter having a value "Jones" (as indicated by window 740). Then, the actor 736 outputs a string "Michael Jones" to actor 752 (as indicated by window 756).

The windows 724, 726, 734, 738, 740, 744, 754, and 756 may be useful to help a user determine whether the actors in the dynamic workflow model are operating properly. For example, the user may confirm via windows 734 and 754 that the "Consumer" string output from actor 734 is successfully received by actor 752. Additionally, user can determine whether the "FIRST NAME" and "LAST NAME" parameters having values "Michael" and "Jones," respectively, are successfully output from actor 712 and received by actor 736 via windows 738 (as indicated by windows 724, 726, 738, and 740). Moreover, the user can determine whether the actor 736 successfully combines the input values "Michael" and "Jones" to output a string having the value "Michael Jones" to actor 752 (as indicated by windows 738, 740, and 756). Additionally or alternatively, the inspector 700 may rely on the information in the windows (or the underlying data) to automatically determine whether the actors in the workflow model are operating properly. The inspector 700 may further provide a status and/or alarm to the user indicating that the actors are working properly or if there is an error. For example, if the user accidentally provides a misspelled or incorrect "FIRST NAME" or "LAST NAME," the user may see via inspector 700 that actors 741 and 742 are executed instead of actors 732 and 736. In such an embodiment, inspector 700 may display window 744 to show the error message "Authentication denied" (in window 744) to the user to notify the user of an error in the retrieval process.

Figure 8:
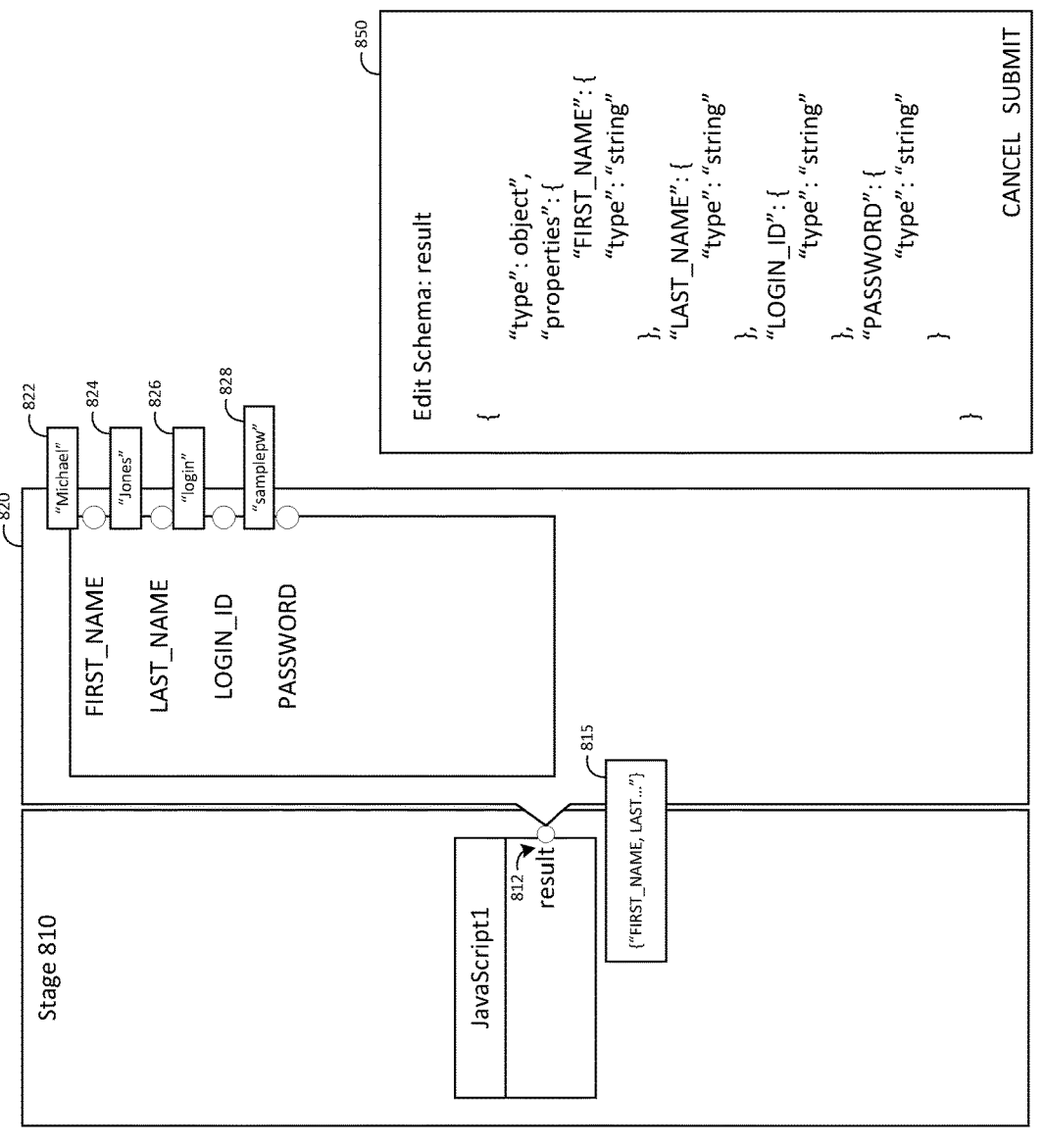
FIG. 8 is a diagram illustrating an example of a dynamic workflow model schema editor, according to an embodiment of the present disclosure.

FIG. 8 is a diagram illustrating an example of a dynamic workflow model schema editor, which allows a user to edit a "schema." A "schema" describes a data type and its associated properties and values. For example, a schema meant to represent data about a person may include an "object" data type along with the "FIRST NAME" and "LAST NAME" properties. As mentioned above in connection with FIG. 3, a user may wish to create new actors or stages (or edit existing ones) to create (or modify) a work-flow or as part of a debugging process. The schema editor is one mechanism for doing so.

In some embodiments, actors and stages may utilize schemas to define data used in the workflow or to design data flows that leverage known data structures. A schema may comprise instructions about how an actor should process input information or data to generate corresponding output information or data. In some embodiments, a schema can be updated or edited during runtime and when the workflow is not being run.

In one embodiment, when a workflow is displayed, a user may use a mouse to click or select an actor, a stage, input to the actor, output from the actor, node, etc. For example, as shown in FIG. 8, a user may select a node 812 (i.e., the output of "JavaScript1" actor in stage 810) to instruct the inspector 700 to display window 820 containing detailed information regarding the selected node 812. When the scheme editor is invoked, the inspector 700 may also display a schema editor window 850, which displays code associated with the selected node. For example, as shown window 850 may display a file, such as a JSON file, associated with the parameters "FIRST NAME," "LAST NAME," "LOGIN ID," and "PASSWORD" displayed in window 820. More-over, a user may examine the actual values of the parameters through windows 822, 824, 826, and 828 during execution and then edit the schema using window 850. For example, the user may change the "type" of the "FIRST NAME" parameter from "string" to "integer" to modify the operation or properties of the "JavaScript1" actor's output. In some embodiments, the user may directly edit the code found in window 850 by entering changes to the information displayed in the window 850 and submitting the edits. Upon submitting the edits, the process may automatically re-execute using the updated schema. Moreover, a user may add additional properties or parameters to the "JavaScript1" actor's output by entering the information via the window 850. It will be appreciated that in some embodiments, a user may implement edits or changes to actors or stages differently.

Figure 9:
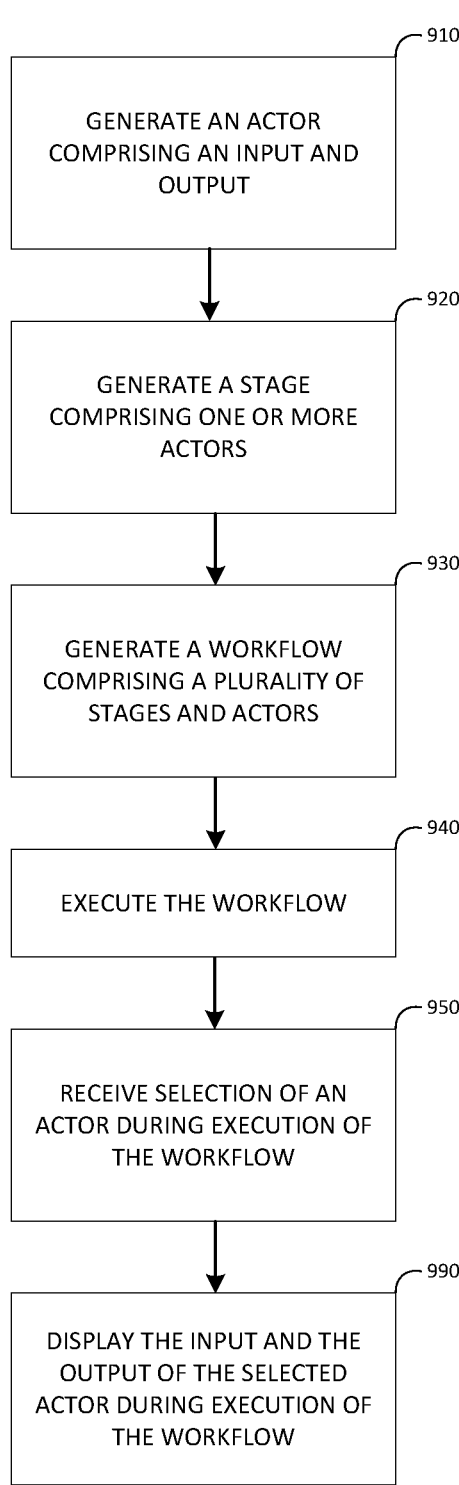
FIG. 9 is a diagram illustrating an example of a dynamic workflow process, according to an embodiment of the present disclosure.

FIG. 9 is a diagram illustrating an example dynamic workflow process. In block 910, workflow system 320 may generate an actor comprising an input and output. In some embodiments, the actor may accept a variety of inputs and provide a variety of outputs. For example, an actor may accept strings, Booleans, arrays, constant values, or other types of data as inputs, and provide similar outputs. An actor may be configured to accept specific types of inputs and to automatically convert a received input into the specified type of information. In some embodiments, the actor's input may be the output from another actor. Therefore, multiple actors may be linked together to form a logic chain. In some embodiments, a logic chain formed by linking multiple actors together may itself be saved as a single actor. In some embodiments, the actor may be stored in a data store to be used at a later point.

In block 920, the system may generate a stage comprising one or more actors. A stage may represent one or more steps in the dynamic workflow process. For example, a three-step process may be divided into a first stage, a second stage, and a third stage. Stages may be arranged and executed in a specific order. For example, a first stage may be executed before a second stage, and the second stage may in turn be executed before a third stage. A user may generate a stage and populate the stage with one or more actors of the user's choosing. In some embodiments, the actors in a particular stage may be executed simultaneously. Each stage may also be assigned an error handler. The error handler may be an actor that contains logic to execute an action if an error occurs during a stage. For example, a stage's error handler may be an actor that terminates the stage upon encountering an error.

In block 930, the system generates a workflow comprising a plurality of stages and actors. It will be appreciated that any number of stages and actors may be used to represent a dynamic workflow. In block 940, the system executes the generated workflow. The workflow system may execute the workflow by executing stages in a specific order by default. For example, if stages are arranged from left to right, then the workflow may be executed by first executing the left-most stage and proceeding sequentially to the right. Alter-natively, the workflow may execute stages in a different order or may be configured to allow a user to selectively configure the workflow to execute the stages in a particular order.

In block 950, the system receives a selection of an actor during execution of the workflow. For example, the system may receive a user input (e.g., a mouse click) that identifies a specific actor in the dynamic workflow. In block 960, the system displays the input and the output of the selected actor during the execution of the workflow. As mentioned above in connection with FIG. 7, the input and output of a selected actor may be displayed using an inspector.

In some embodiments, the dynamic workflow process may include additional or fewer steps. For example, the dynamic workflow may also include receiving, during execution of a workflow, an edit to the workflow comprising at least an edit to an actor from the plurality of actors. The system may generate a modified actor based at least partly on the received edit and execute a modified workflow based at least partly on the modified actor.

Moreover, some or all of the structure and functionality of the embodiments described above may be implemented on a single processor or a single server. Alternatively, some or all of the structure and functionality of the embodiments described above may be implemented via a distributed network of processors and servers located in the same or different remote locations.

As will be apparent to one of ordinary skill in the art from a reading of this disclosure, the disclosed subject matter can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

The invention claimed is:

1. A workflow modeling system, comprising:
at least one interface configured to output workflow information; and
circuitry configured to generate the workflow information and receive a user input,
wherein the workflow information comprises information representing:
a first actor configured to perform a first operation and having a first output for outputting first data, and
a second actor configured to perform a second operation and having a first input for inputting the first data from the first output, wherein the user input is directed to the first output or the first input, and wherein the workflow information is configured to provide:

a first visual representation of an order in which the first actor performs the first operation and the second actor performs the second operation, and in response to the user input, a second visual representation of additional data related to the first data, the second visual representation overlaid on the first visual representation.

2. The workflow modeling system as claimed in claim 1, wherein, in the second visual representation, the additional data related to the first data indicates a value of the first data.

3. The workflow modeling system as claimed in claim 1, wherein, in the second visual representation, the additional data related to the first data indicates a data type of the first data.

4. The workflow modeling system as claimed in claim 1, wherein the workflow information further comprises information representing:

a first stage representing a first step in a workflow related to the workflow information and comprising the first actor, and a second stage representing a second step in the workflow and comprising the second actor.

5. The workflow modeling system as claimed in claim 4, wherein the first stage comprises the first actor and a third actor configured to perform a third operation.

6. The workflow modeling system as claimed in claim 4, wherein the second stage comprises the second actor and a third actor configured to perform a third operation.

7. The workflow modeling system as claimed in claim 1, wherein the workflow information further comprises information representing a third actor for performing a third operation.

8. The workflow modeling system as claimed in claim 7, wherein the third actor has a second input for inputting the first data from the first output.

9. The workflow modeling system as claimed in claim 7, wherein the first actor has a second output for outputting second data, and wherein the third actor has a second input for inputting the second data from the second output.

10. The workflow modeling system as claimed in claim 9, wherein the workflow information is configured provide, in the first visual representation, a third visual representation of additional data related to the second data.

11. The workflow modeling system as claimed in claim 10, wherein, in the second visual representation, the additional data related to the first data indicates at least one of a first value of the first data or a first data type of the first data, and wherein, in the third visual representation, the additional data related to the second data indicates at least one of a second value of the second data or a second data type of the second data.

12. The workflow modeling system as claimed in claim 11, wherein additional data related to the first data comprises the first data type of the first data and the additional data related to the second data comprises the second data type of the second data, and wherein the first data type is different than the second data type.

13. The workflow modeling system as claimed in claim 11, wherein the circuitry is further configured to:

receive a first user input directed to first output or the first input, receive a second user input directed to the second output or the second input, in response to the first user input, provide the second visual representation, and in response to the second user input, provide the third visual representation.

14. The workflow modeling system as claimed in claim 1, wherein the circuitry comprises at least one processor configured to generate the workflow information.

15. A non-transitory computer-readable medium storing executable instructions that, when executed by one or more processors, cause a system to generate workflow information, wherein the workflow information comprises information representing:

a first actor configured to perform a first operation and having a first output for outputting first data, and a second actor configured to perform a second operation and having a first input for inputting the first data from the first output, wherein the workflow information is configured to provide:

a first visual representation of an order in which the first actor performs the first operation and the second actor performs the second operation, and in response to a user input directed to the first output or the first input, a second visual representation of additional data related to the first data, the second visual representation overlaid on the first visual representation.

16. The non-transitory computer-readable medium as claimed in claim 15, wherein the workflow information further comprises information representing:

a first stage representing a first step in a workflow related to the workflow information and comprising the first actor, and a second stage representing a second step in the workflow and comprising the second actor.

17. The non-transitory computer-readable medium as claimed in claim 15, wherein the workflow information further comprises information representing a third actor for performing a third operation.

18. The non-transitory computer-readable medium as claimed in claim 17, wherein the first actor has a second output for outputting second data, and wherein the third actor has a second input for inputting the second data from the second output.

19. The non-transitory computer-readable medium as claimed in claim 15, wherein, in the second visual representation, the additional data related to the first data indicates a value of the first data.

20. The non-transitory computer-readable medium as claimed in claim 15, wherein, in the second visual representation, the additional data related to the first data indicates a data type of the first data.

\* \* \* \* \*